United States Patent
Yan

(10) Patent No.: US 9,462,053 B2
(45) Date of Patent: Oct. 4, 2016

(54) METHOD AND APPARATUS FOR CONNECTION ESTABLISHMENT

(71) Applicant: Huawei Technologies Co., Ltd., Shenzhen (CN)

(72) Inventor: Xuesong Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 14/585,887

(22) Filed: Dec. 30, 2014

(65) Prior Publication Data

US 2015/0113155 A1    Apr. 23, 2015

Related U.S. Application Data

(63) Continuation of application No. PCT/CN2014/083785, filed on Aug. 6, 2014.

(30) Foreign Application Priority Data

Aug. 9, 2013 (CN) .......................... 2013 1 0347450

(51) Int. Cl.
H04L 29/08 (2006.01)

(52) U.S. Cl.
CPC ........... *H04L 67/1076* (2013.01); *H04L 67/14* (2013.01); *H04L 67/26* (2013.01)

(58) Field of Classification Search
USPC ....... 709/228, 219, 229, 227, 208, 224, 223, 709/202
See application file for complete search history.

(56) References Cited

U.S. PATENT DOCUMENTS

| | | | |
|---|---|---|---|
| 8,271,780 B2* | 9/2012 | Xiao | H04L 41/0893 713/155 |
| 2004/0177247 A1* | 9/2004 | Peles | H04L 63/104 713/155 |

(Continued)

FOREIGN PATENT DOCUMENTS

| | | |
|---|---|---|
| CN | 102355496 A | 2/2012 |
| CN | 102395123 A | 3/2012 |

(Continued)

OTHER PUBLICATIONS

Partial English Translation and Abstract of Chinese Patent Application No. CN103428287A, Mar. 3, 2015, 4 pages.
Foreign Communication From a Counterpart Application, PCT Application No. PCT/CN2014/083785, English Translation of International Search Report dated Nov. 18, 2014, 2 pages.

(Continued)

*Primary Examiner* — Jude Jean Gilles
(74) *Attorney, Agent, or Firm* — Conley Rose, P.C.; Grant Rodolph; William H. Dietrich

(57) ABSTRACT

A method and an apparatus for connection establishment are provided. The method includes receiving a registration request and a connection request that are sent by a client based on a service, generating a policy instruction for the service according to service information carried in the registration request when the service is registered successfully according to the registration request, feeding back the policy instruction to the client, instructing the client to adjust, according to the policy instruction, the on-off state of the connection between the server and the client and established for the service, establishing, the connection between the server and the client for the service, and adjusting, based on the policy instruction, the on-off state of the connection to solve a problem in the prior art that a large amount of electricity is consumed by the client.

20 Claims, 5 Drawing Sheets

(56) References Cited

U.S. PATENT DOCUMENTS

| | | | |
|---|---|---|---|
| 2005/0050173 A1* | 3/2005 | Kikuchi | G06F 17/30867 |
| | | | 709/219 |
| 2006/0041669 A1* | 2/2006 | Bemmel | H04L 63/10 |
| | | | 709/229 |
| 2008/0194231 A1* | 8/2008 | Kim | H04L 63/08 |
| | | | 455/411 |
| 2011/0085470 A1* | 4/2011 | Park | H04L 29/12028 |
| | | | 370/254 |
| 2012/0265873 A1 | 10/2012 | Alund et al. | |
| 2013/0179583 A1* | 7/2013 | Foti | H04L 65/1016 |
| | | | 709/228 |
| 2014/0133383 A1* | 5/2014 | Park | H04L 12/185 |
| | | | 370/312 |

FOREIGN PATENT DOCUMENTS

| | | |
|---|---|---|
| CN | 102404701 A | 4/2012 |
| CN | 102480517 A | 5/2012 |
| CN | 102571704 A | 7/2012 |
| CN | 103037483 A | 4/2013 |
| CN | 103428287 A | 12/2013 |

OTHER PUBLICATIONS

Foreign Communication From a Counterpart Application, PCT Application No. PCT/CN2014/083785, Written Opinion dated Nov. 18, 2014, 5 pages.

Paterson, I., et al., "XEP-0124: Bidirectional-streams Over Synchronous HTTP (BOSH)," Retrieved from the Internet: URL:http://web.archive.org/web/20130731231629/http://xmpp.org/extensions/xep-0124.html [retrieved on Aug. 11, 2015], XP055207183, Jul. 2, 2010, 35 pages.

Russell, A., et al., "Bayeux Protocol—Bayeux 1.0.0," Retrieved from the Internet: URL:http://web.archive.org/web/20130724122145/http://svn.cometd.org/trunk/bayeux/bayeux.html [retrieved on Aug. 11, 2015], XP0550207284, Jul. 24, 2013, 19 pages.

Foreign Communication From a Counterpart Application, European Application No. 14814669.9, Extended European Search Report dated Aug. 19, 2015, 10 pages.

Partial English Translation and Abstract of Chinese Patent Application No. CN102355496, Feb. 22, 2016, 10 pages.

Partial English Translation and Abstract of Chinese Patent Application No. CN102571704, Feb. 22, 2016, 15 pages.

Foreign Communication From a Counterpart Application, Chinese Application No. 201310347450.3, Chinese Office Action dated Jan. 5, 2016, 8 pages.

* cited by examiner

METHOD AND APPARATUS FOR CONNECTION ESTABLISHMENT

CROSS-REFERENCE TO RELATED APPLICATIONS

This application is a continuation of International Application No. PCT/CN2014/083785, filed on Aug. 6, 2014, which claims priority to Chinese Patent Application No. 201310347450.3, filed on Aug. 9, 2013, both of which are hereby incorporated by reference in their entireties.

TECHNICAL FIELD

The present invention relates to the field of communications technologies, and in particular, to a method and an apparatus for connection establishment.

BACKGROUND

A push (PUSH) technology is an information push technology between a server and a client. In the PUSH technology, a connection path is generally established between the client and the server and the server pushes, according to a service requirement, information to the client by using the connection path. Currently, the PUSH technology is generally applied to an application scenario where the server interacts with the client. The server needs to transmit, according to a service requirement, information of a certain length to the client by using a Transmission Control Protocol (TCP) connection. Therefore, in the PUSH technology, a long-time effective TCP connection is generally established between the client and the server, and the long-time effective TCP connection is maintained by using a heartbeat reaction.

The long-time effective TCP connection needs to be maintained by using the heartbeat reaction, while the heartbeat reaction requires the client to initiate data calls frequently and brings about high-frequency wireless data transmissions, so that the amount of electricity consumed by the client is relatively large.

SUMMARY

Embodiments of the present invention provide a method and an apparatus for connection establishment, which solves an problem in the prior art that a large amount of electricity is consumed by a client because the client needs to initiate data calls frequently to maintain a TCP connection with a server for a long period of time.

Specific technical solutions provided by the embodiments of the present invention are as follows.

According to a first aspect, a method for connection establishment is provided, where the method includes receiving a registration request and a connection request that are sent by a client based on a service, generating a policy instruction for the service according to service information carried in the registration request when the service is registered successfully according to the registration request, where the policy instruction is used to instruct to adjust an on-off state of a connection between a server and the client and established for the service; feeding back the policy instruction to the client, and instructing the client to adjust, according to the policy instruction, the on-off state of the connection between the server and the client and established for the service; and establishing, based on the connection request, the connection between the server and the client for the service, and adjusting, based on the policy instruction, the on-off state of the connection.

With reference to the first aspect, in a first possible implementation manner of the first aspect, the generating a policy instruction for the service includes determining a connection mechanism of the service according to the service information of the service, generating a connection instruction that carries a preset trigger condition, and using the connection mechanism and the connection instruction that carries the preset trigger condition as the policy instruction for the service.

With reference to the first possible implementation manner of the first aspect, in a second possible implementation manner of the first aspect, the connection mechanism includes an instant connection mechanism or a non-instant connection mechanism, where the connection instruction includes one of a connection maintaining instruction, a disconnection instruction, a reconnection instruction, and a combination thereof; and the preset trigger condition includes expiry of a preset time limit and/or a change of a related service status.

With reference to the second possible implementation manner of the first aspect, in a third possible implementation manner of the first aspect, the reconnection instruction includes one of an instant reconnection instruction, a timed reconnection instruction, and a step-by-step reconnection instruction.

With reference to the third possible implementation manner of the first aspect, in a fourth possible implementation manner of the first aspect, the adjusting the on-off state of the connection includes maintaining the connection in an on state when the connection mechanism in the policy instruction is an instant connection mechanism, adjusting the connection to any one of a persistent connection, a polling connection, or a short connection according to the connection instruction in the policy instruction, and disconnecting the connection and determining, according to the reconnection instruction in the policy instruction, that a connection reestablishment manner is timed reconnection or step-by-step reconnection when a preset trigger condition of the disconnection instruction in the policy instruction is met.

With reference to the third possible implementation manner of the first aspect, in a fifth possible implementation manner of the first aspect, the adjusting the on-off state of the connection includes disconnecting the connection and determining, according to the reconnection instruction in the policy instruction, that a connection reestablishment manner is timed reconnection or step-by-step reconnection when the connection mechanism in the policy instruction is a non-instant connection mechanism.

With reference to the first aspect or any one of the possible implementation manners of the first aspect, in a sixth possible implementation manner of the first aspect, where after the connection is established between the server and the client, the method further includes pushing, based on the established connection and according to a message transmission request sent by the client for the service, a push message of the service to the client.

According to a second aspect, an embodiment of the present invention provides a method for connection establishment, where the method includes sending, based on a service, a registration request and a connection request to a server, receiving a policy instruction generated and sent by the server for the service according to service information carried in the registration request, when the service is registered successfully according to the registration request, and adjusting an on-off state of the connection according to the policy instruction after the server establishes, based on the connection request, a connection between the server and a client for the service.

With reference to the second aspect, in a first possible implementation manner of the second aspect, the policy instruction includes a connection mechanism of the service and a connection instruction that carries a preset trigger condition.

With reference to the first possible implementation manner of the second aspect, in a second possible implementation manner of the second aspect, the connection mechanism includes an instant connection mechanism or a non-instant connection mechanism, the connection instruction includes one of a connection maintaining instruction, a disconnection instruction, a reconnection instruction, and a combination thereof, and the preset trigger condition includes expiry of a preset time limit and/or a change of a related service status.

With reference to the second possible implementation manner of the second aspect, in a third possible implementation manner of the second aspect, the reconnection instruction includes one of an instant reconnection instruction, a timed reconnection instruction, and a step-by-step reconnection instruction.

With reference to the third possible implementation manner of the second aspect, in a fourth possible implementation manner of the second aspect, the adjusting an on-off state of the connection according to the policy instruction includes maintaining the connection in an on state when the connection mechanism in the policy instruction is an instant connection mechanism, adjusting the connection to any one of a persistent connection, a polling connection, or a short connection according to the connection instruction in the policy instruction, and disconnecting the connection and determining, according to the reconnection instruction in the policy instruction, that a connection reestablishment manner is timed reconnection or step-by-step reconnection when a preset trigger condition of the disconnection instruction in the policy instruction is met.

With reference to the third possible implementation manner of the second aspect, in a fifth possible implementation manner of the second aspect, the adjusting an on-off state of the connection according to the policy instruction includes disconnecting the connection; and determining, according to the reconnection instruction in the policy instruction, that a connection reestablishment manner is timed reconnection or step-by-step reconnection when the connection mechanism in the policy instruction is a non-instant connection mechanism.

With reference to the second aspect or one of the possible implementation manners of the second aspect, in a sixth possible implementation manner of the second aspect, after the server establishes, based on the connection request, the connection between the server and the client for the service, the method further includes receiving a push message of the service and pushed by the server based on the established connection, where the push message of the service is pushed by the server according to a message transmission request sent by the client for the service.

According to a third aspect, an embodiment of the present invention provides an apparatus for connection establishment, where the apparatus includes a receiving module configured to receive a registration request and a connection request that are sent by a client based on a service, a generating module configured to generate a policy instruction for the service according to service information carried in the registration request when the service is registered successfully according to the registration request, where the policy instruction is used to instruct to adjust an on-off state of a connection between the apparatus and the client and established for the service, a feedback module configured to feed back the policy instruction to the client and instruct the client to adjust, according to the policy instruction, the on-off state of the connection between the apparatus and the client and established for the service, and a connecting module configured to establish, based on the connection request, the connection between the apparatus and the client for the service, and adjust, based on the policy instruction, the on-off state of the connection.

With reference to the third aspect, in a first possible implementation manner of the third aspect, the generating module is configured to determine a connection mechanism of the service according to the service information of the service when the service is registered successfully according to the registration request, generate a connection instruction that carries a preset trigger condition, and use the connection mechanism and the connection instruction that carries the preset trigger condition as the policy instruction for the service.

With reference to the first possible implementation manner of the third aspect, in a second possible implementation manner of the third aspect, the connection mechanism includes an instant connection mechanism or a non-instant connection mechanism, the connection instruction includes one of a connection maintaining instruction, a disconnection instruction, a reconnection instruction, and a combination thereof, and the preset trigger condition includes expiry of a preset time limit and/or a change of a related service status.

With reference to the second possible implementation manner of the third aspect, in a third possible implementation manner of the third aspect, the reconnection instruction includes one of an instant reconnection instruction, a timed reconnection instruction, and a step-by-step reconnection instruction.

With reference to the third possible implementation manner of the third aspect, in a fourth possible implementation manner of the third aspect, the connecting module includes a first submodule configured to establish, based on the connection request, the connection between the apparatus and the client for the service, and a second submodule configured to maintain the connection in an on state when the connection mechanism in the policy instruction is an instant connection mechanism, adjust the connection to one of a persistent connection, a polling connection, or a short connection according to the connection instruction in the policy instruction, and disconnect the connection and determine, according to the reconnection instruction in the policy instruction, that a connection reestablishment manner is timed reconnection or step-by-step reconnection when a preset trigger condition of the disconnection instruction in the policy instruction is met.

With reference to the third possible implementation manner of the third aspect, in a fifth possible implementation manner of the third aspect, the connecting module includes a first submodule configured to establish, based on the connection request, the connection between the apparatus and the client for the service, and a second submodule configured to disconnect the connection and determine, according to the reconnection instruction in the policy instruction, that a connection reestablishment manner is timed reconnection or step-by-step reconnection when the connection mechanism in the policy instruction is a non-instant connection mechanism.

With reference to the third aspect or y one of the possible implementation manners of the third aspect, in a sixth possible implementation manner of the third aspect, the feedback module is further configured to push, based on the established connection and according to a message transmission request sent by the client for the service, a push message of the service to the client after the connection is established between the apparatus and the client.

According to a fourth aspect, an embodiment of the present invention provides an apparatus for connection establishment, where the apparatus includes a sending module configured to send, based on a service, a registration request and a connection request to a server, a receiving module configured to receive a policy instruction generated and sent by the server for the service according to service information carried in the registration request when the service is registered successfully according to the registration request, and an adjusting module configured to adjust an on-off state of the connection according to the policy instruction after the server establishes, based on the connection request, a connection between the server and the apparatus for the service.

With reference to the fourth aspect, in a first possible implementation manner of the fourth aspect, the policy instruction includes a connection mechanism of the service and a connection instruction that carries a preset trigger condition.

With reference to the first possible implementation manner of the fourth aspect, in a second possible implementation manner of the fourth aspect, the connection mechanism includes an instant connection mechanism or a non-instant connection mechanism, the connection instruction includes one of a connection maintaining instruction, a disconnection instruction, a reconnection instruction, and a combination thereof, and the preset trigger condition includes expiry of a preset time limit and/or a change of a related service status.

With reference to the second possible implementation manner of the fourth aspect, in a third possible implementation manner of the fourth aspect, the reconnection instruction includes any one of an instant reconnection instruction, a timed reconnection instruction, and a step-by-step reconnection instruction.

With reference to the third possible implementation manner of the fourth aspect, in a fourth possible implementation manner of the fourth aspect, the adjusting module is configured to maintain the connection in an on state when the connection mechanism in the policy instruction is an instant connection mechanism after the server establishes, based on the connection request, the connection between the server and the apparatus for the service, adjust the connection to any one of a persistent connection, a polling connection, or a short connection according to the connection instruction in the policy instruction, and disconnect the connection and determine, according to the reconnection instruction in the policy instruction, that a connection reestablishment manner is timed reconnection or step-by-step reconnection when a preset trigger condition of the disconnection instruction in the policy instruction is met.

With reference to the third possible implementation manner of the fourth aspect, in a fifth possible implementation manner of the fourth aspect, the adjusting module is configured to disconnect the connection and determine, according to the reconnection instruction in the policy instruction, that a connection reestablishment manner is timed reconnection or step-by-step reconnection after the server establishes, based on the connection request, the connection between the server and the apparatus for the service and when the connection mechanism in the policy instruction is a non-instant connection mechanism.

With reference to the fourth aspect or any one of the possible implementation manners of the fourth aspect, in a sixth possible implementation manner of the fourth aspect, the receiving module is further configured to: after the server establishes, based on the connection request, the connection between the server and the apparatus for the service, receive a push message of the service and pushed by the server based on the established connection, where the push message is pushed by the server according to a message transmission request sent by the apparatus for the service.

In the embodiments of the present invention, a corresponding registration response and a policy instruction are fed back according to service information of the service when it is determined that a client has registered successfully for a service, an on-off state of a connection between a server and the client is adjusted according to the policy instruction, a maintaining time of the connection is determined according to an actual requirement, and the connection is disconnected in time when there is no service requirement, which avoids that the connection between the server and the client is maintained for a long period of time and eliminates the need of frequent initiation of data calls, thereby avoiding a problem of over consumption of electricity.

DESCRIPTION OF EMBODIMENTS

The following describes exemplary embodiments of the present invention with reference to the accompanying drawings.

Figure 1:
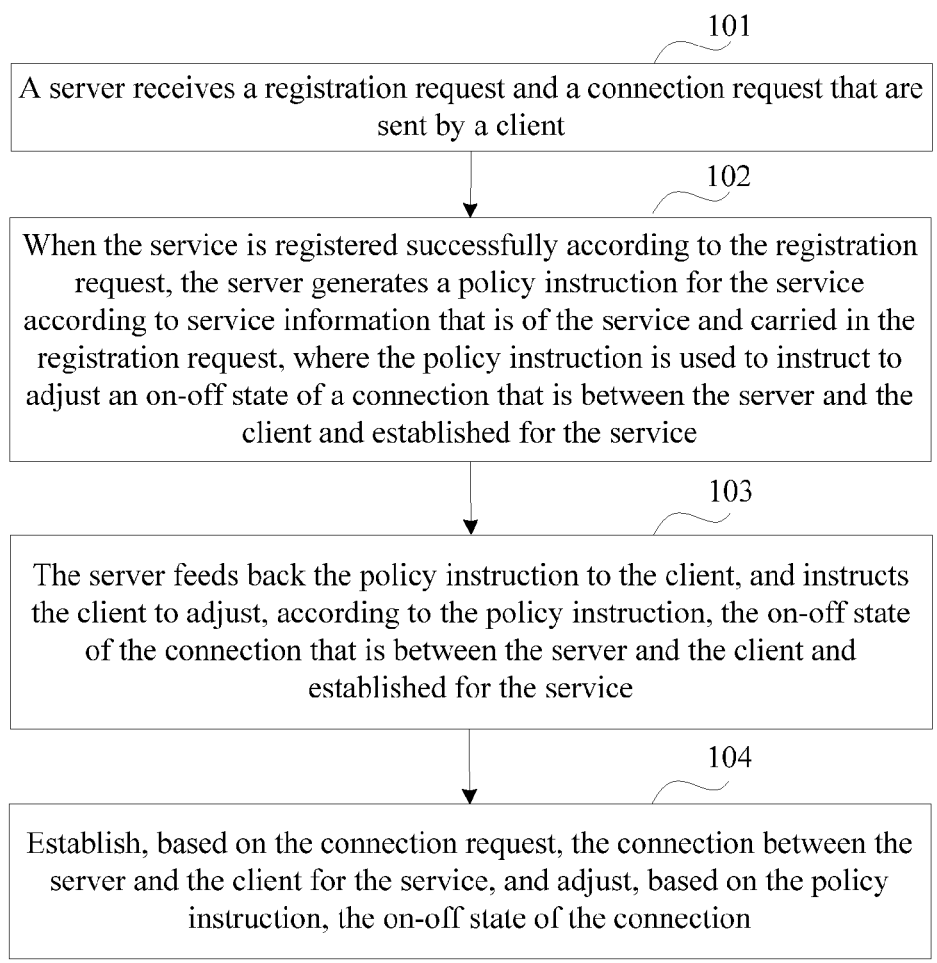
FIG. 1 is a flowchart of a method for connection establishment designed according to an embodiment of the present invention.

With reference to FIG. 1, the present invention designs a method for connection establishment, and the method includes the following steps.

Step 101: A server receives a registration request and a connection request that are sent by a client.

Step 102: When the service is registered successfully according to the registration request, the server generates a policy instruction for the service according to service information carried in the registration request, where the policy instruction is used to instruct to adjust an on-off state of a connection between the server and the client and established for the service.

Step 103: The server feeds back the policy instruction to the client, and instructs the client to adjust, according to the policy instruction, the on-off state of the connection between the server and the client and established for the service.

Step 104: Establish, based on the connection request, the connection between the server and the client for the service, and adjust, based on the policy instruction, the on-off state of the connection.

The registration request and/or connection request may include a device identifier of the client, for example, an encrypted International Mobile Station Equipment Identity (IMEI) number.

A registration response may include a registration token (that is, a TOKEN identifier). The registration token may be a parameter corresponding to the service.

Preferably, the server may generate the policy instruction by determining a connection mechanism of the service according to the service information of the service, generating a connection instruction that carries a preset trigger condition, and using the connection mechanism and the connection instruction that carries the preset trigger condition as the policy instruction for the service.

Optionally, the connection mechanism may include but is not limited to an instant connection mechanism or a non-instant connection mechanism.

The connection instruction may include but is not limited to any one of the following or a combination thereof: a connection maintaining instruction, a disconnection instruction, and a reconnection instruction.

The preset trigger condition includes but is not limited to expiry of a preset time limit and/or a change of a related service status.

The reconnection instruction may include but is not limited to any one of an instant reconnection instruction, a timed reconnection instruction, and a step-by-step reconnection instruction.

The instant reconnection may be as follows. After the connection between the client and the server is disconnected, a connection between the client and the server is reestablished immediately.

The timed reconnection is as follows. After the connection between the client and the server is disconnected, a connection between the client and the server attempts to be reestablished when preset duration expires.

The step-by-step reconnection is as follows. After the connection between the client and the server is disconnected, a connection between the client and the server attempts to be reestablished at different duration intervals. Generally, in the step-by-step reconnection, an interval between two neighboring attempts of the client to reestablish a connection is gradually longer.

The adjusting, based on the policy instruction, the on-off state of the connection may be implemented in the following manners without limitation thereto.

Manner 1: Maintaining the connection in an on state when the connection mechanism in the policy instruction is an instant connection mechanism, adjusting the connection to any one of a persistent connection, a polling connection, or a short connection according to the connection instruction in the policy instruction, and disconnecting the connection and determining, according to the reconnection instruction in the policy instruction, that a connection reestablishment manner is timed reconnection or step-by-step reconnection when a preset trigger condition of the disconnection instruction in the policy instruction is met.

Manner 2: When the connection mechanism in the policy instruction is a non-instant connection mechanism, disconnecting the connection and determining, according to the reconnection instruction in the policy instruction, that a connection reestablishment manner is timed reconnection or step-by-step reconnection.

After the connection is established between the server and the client, the server may push a PUSH message of the service to the client according to a message transmission request sent by the client for the service to implement a message PUSH process of the service.

The connection between the server and the client may be a TCP connection, and may also be another connection such as a Transport Layer Security (TLS) connection.

In an actual application, when the service is registered successfully according to the registration request, the server may further generate the policy instruction for the service according to the service information carried in the registration request and application environment information inside the server and stored for the client.

The application environment information may be information such as an application type and a policy instruction of another application inside the client. In this way, according to this embodiment of the present invention, a policy instruction can be generated for each service according to a different application environment of the client and by considering message push requirement of each service in the client.

To save traffic, the server and the client may transmit a message to each other based on a binary string manner or a formatted string manner. To ensure extensibility of the message, the server and the client may also transmit a message to each other based on an extensible description language such as JavaScript Object Notation (JSON) or Extensible Markup Language (XML). Therefore, the policy instruction may be based on a binary string or a formatted string, and may also be based on the JSON or XML extensible description language.

Figure 2:
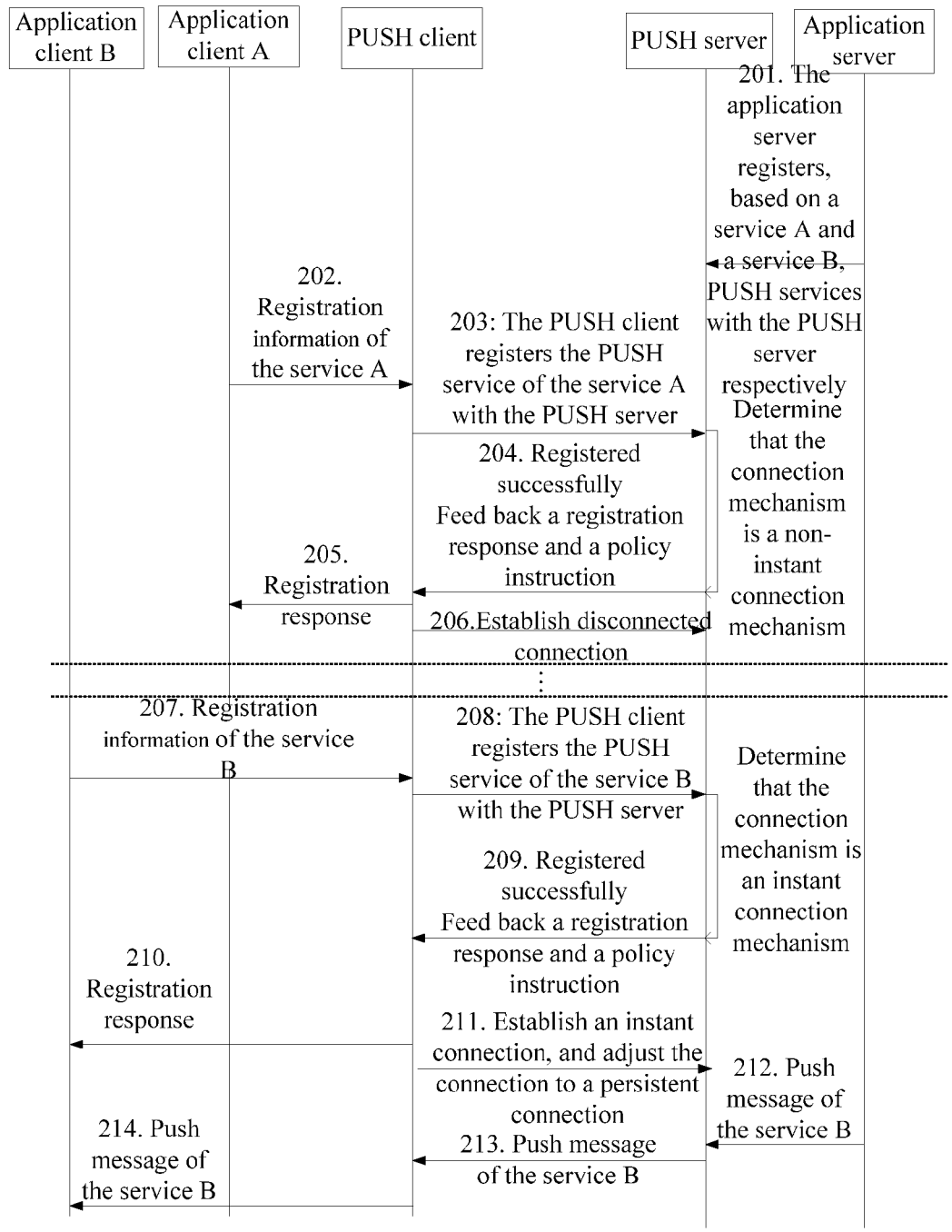
FIG. 2 is an information interaction diagram according to Embodiment 1 of the present invention.

Embodiment 1: An application A and an application B are different applications of a same client, and both the application A and the application B need a PUSH service. In the client, the application A executes a service A, and the application B executes a service B. A process of Embodiment 1 of the present invention is shown in FIG. 2. FIG. 2 includes an application client (including an application client A and an application client B), a PUSH client, a PUSH server, and an application server. The application client may be a terminal such as a mobile phone or a computer, and the application client A and the application client B may be different application software on a same client. The PUSH client may be software that has a PUSH function and runs on a client independently, or software that has a PUSH function and is embedded into an application. The PUSH server may be a server of a PUSH message. The application server may be a remote server of the application A and the application B. The application client and the PUSH client may be different parts of a same entity apparatus (that is, the client). The PUSH server and the application server may be different parts (for example, different software modules or different hardware parts) of a same server, and may also be two servers.

When no application client registers with the PUSH server, the PUSH client does not need to consume electricity or traffic; and when activating a connection with the PUSH server, the PUSH client does not need to consume electricity or traffic either, so that activity of the connection is maintained.

Step 201: An application server A registers, based on a service A and a service B, PUSH services with the PUSH server, respectively.

Step 202: The application client A sends registration information of the service A to the PUSH client.

Step 203: The PUSH client registers the PUSH service of the service A with the PUSH server.

In step 203, the PUSH client sends a registration request and a connection request of the service A to the PUSH server, where the registration request includes the registration information of the service A. The connection request may be a TLS connection request, a TCP connection request, or the like.

Step 204: The PUSH server determines that the service A is registered successfully, and feeds back a registration response and a policy instruction to the PUSH client.

The execution of step 204 means that a connection between the PUSH client and the PUSH server is established successfully.

It is assumed that the PUSH server determines, according to the registration information of the service A, that a connection mechanism of the PUSH service that is registered by the application server based on the service A is a non-instant connection mechanism and that the service A needs to restart the PUSH service after an interval of 30 minutes. In this case, the PUSH server may generate a policy instruction of the service A, where a connection mechanism included in the policy instruction is a non-instant connection mechanism, a reconnection mechanism included in the policy instruction is a timed reconnection instruction, and reconnection interval duration of the reconnection instruction is 30 minutes.

Step 205: The PUSH client sends a registration response to the application client.

Step 206: The PUSH client establishes disconnected connection between the PUSH client and the PUSH server according to the policy instruction.

The PUSH client may reestablish a connection with the PUSH server according to the policy instruction after the connection is disconnected for 30 minutes, and check whether the PUSH server has a message that can be pushed.

Step 206 is a step in an information interaction process of the service A, and step 207 is a step in an information interaction process of the service B. Therefore, in an actual application, an interval may exist between step 206 and step 207, and during this interval, there may also be a process of interaction on other information between the client and the server.

Step 207: The application client B sends registration information of the service B to the PUSH client.

Step 208: The PUSH client registers the PUSH service of the service B with the PUSH server.

In step 208, the PUSH client sends a registration request and a connection request of the service B to the PUSH server, where the registration request includes the registration information of the service B. The connection request may be a TLS connection request, a TCP connection request, or the like.

Step 209: The PUSH server determines that the service B is registered successfully, and feeds back a registration response and a policy instruction to the PUSH client.

It is assumed that the PUSH server determines, according to the registration information of the service B, that a connection mechanism that is of the PUSH service and registered by the application server based on the service B is an instant connection mechanism and that the service B needs to maintain the connection for a long period of time for message transmission. In this case, the PUSH server may generate a policy instruction of the service B, where a connection mechanism included in the policy instruction is an instant connection mechanism and the policy instruction instructs to adjust the established connection to a persistent connection. The policy instruction may also indicate that a fixed heartbeat period of the persistent connection is 3 minutes.

Step 210: The PUSH client sends registration response to the application client B.

Step 211: The PUSH client receives the registration response and the policy instruction delivered by the PUSH server, establishes an instant connection according to the policy instruction, and adjusts the instant connection to a persistent connection.

After adjusting the instant connection to a persistent connection, the PUSH client may send heartbeat information to the PUSH server when each heartbeat period expires, so as to maintain the persistent connection.

Step 212: The application server sends a PUSH message of the service B to the PUSH server.

Step 213: The PUSH server sends the PUSH message of the service B in real time by using the persistent connection.

Step 214: The PUSH client sends the PUSH message of the service B to the application client B in real time, and displays the message by using the application B.

According to this embodiment of the present invention, a server can perform intelligent analysis on a service registered by a client, and use different connection policies according to different scenarios, different time segments, services of different clients or different services of a same client, which avoids that a same connection policy is used for all services, all time segments, and all scenarios, so that consumption of traffic and electricity of the client is saved intelligently while service experience is ensured.

Figure 3:
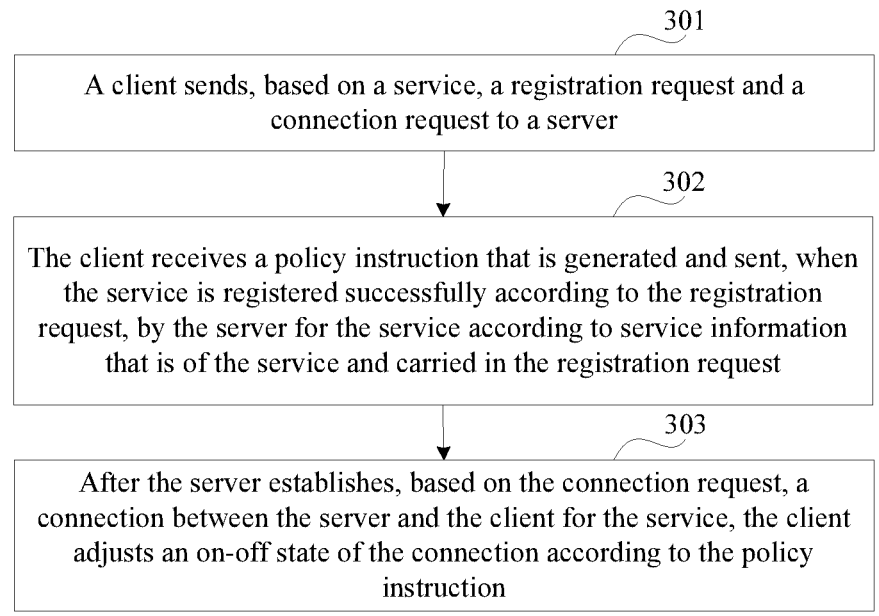
FIG. 3 is a flowchart of another method for connection establishment designed according to an embodiment of the present invention.

Based on a same design idea, an embodiment of the present invention further designs a method for connection establishment. As shown in FIG. 3, the method includes the following steps:

Step 301: A client sends, based on a service, a registration request and a connection request to a server.

Step 302: The client receives a policy instruction generated and sent, when the service is registered successfully according to the registration request, by the server for the service according to service information carried in the registration request.

Step 303: After the server establishes, based on the connection request, a connection between the server and the client for the service, the client adjusts an on-off state of the connection according to the policy instruction.

Preferably, the policy instruction may include but is not limited to a connection mechanism of the service and a connection instruction that carries a preset trigger condition.

Optionally, the connection mechanism may include but is not limited to an instant connection mechanism or a non-instant connection mechanism.

The connection instruction may include but is not limited to any one of the following or a combination thereof: a connection maintaining instruction, a disconnection instruction, and a reconnection instruction.

The preset trigger condition may include but is not limited to expiry of a preset time limit and/or a change of a related service status.

The reconnection instruction may include but is not limited to any one of an instant reconnection instruction, a timed reconnection instruction, and a step-by-step reconnection instruction.

Preferably, the adjusting an on-off state of the connection according to the policy instruction may be implemented in the following manners without limitation thereto.

Manner 1: Maintaining the connection in an on state when the connection mechanism in the policy instruction is an instant connection mechanism; adjusting the connection to any one of a persistent connection, a polling connection or a short connection according to the connection instruction in the policy instruction, and disconnecting the connection and determining, according to the reconnection instruction in the policy instruction, that a connection reestablishment manner is timed reconnection or step-by-step reconnection when a preset trigger condition of the disconnection instruction in the policy instruction is met.

Manner 2: When the connection mechanism in the policy instruction is a non-instant connection mechanism, disconnecting the connection and determining, according to the reconnection instruction in the policy instruction, that a connection reestablishment manner is timed reconnection or step-by-step reconnection.

After the server establishes, based on the connection request, the connection between the server and the client for the service, the client may receive a push message of the service and pushed by the server based on the established connection, where the push message of the service is pushed by the server according to a message transmission request sent by the client for the service.

In this embodiment of the present invention, a client can adjust, based on a connection policy sent by a server for a service, connectivity of a connection according to an application scenario, which avoids a problem of over consumption of electricity caused by frequent initiation of data calls.

Figure 4:
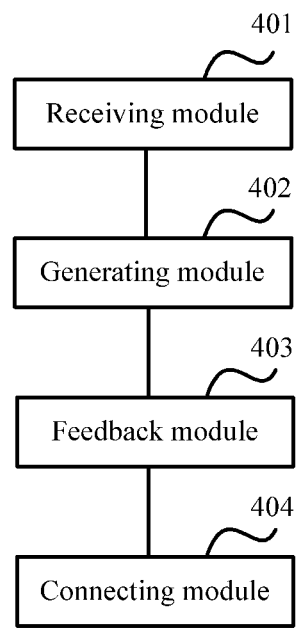
FIG. 4 is a schematic diagram of an apparatus for connection establishment designed according to an embodiment of the present invention.

Based on the same design idea, an embodiment of the present invention further designs an apparatus for connection establishment. As shown in FIG. 4, the apparatus includes a receiving module 401 configured to receive a registration request and a connection request that are sent by a client based on a service, a generating module 402 configured to generate a policy instruction for the service according to service information carried in the registration request when the service is registered successfully according to the registration request, where the policy instruction is used to instruct to adjust an on-off state of a connection between the apparatus and the client and established for the service, a feedback module 403 configured to: feed back the policy instruction to the client, and instruct the client to adjust, according to the policy instruction, the on-off state of the connection between the apparatus and the client and established for the service, and a connecting module 404 configured to establish, based on the connection request, the connection between the apparatus and the client for the service and, and adjust, based on the policy instruction, the on-off state of the connection.

Preferably, the generating module 402 is configured to determine a connection mechanism of the service according to the service information of the service when the service is registered successfully according to the registration request, generate a connection instruction that carries a preset trigger condition, and use the connection mechanism and connection instruction that carries the preset trigger condition as the policy instruction for the service.

Optionally, the connection mechanism may include but is not limited to an instant connection mechanism or a non-instant connection mechanism.

The connection instruction may include but is not limited to any one of the following or a combination thereof: a connection maintaining instruction, a disconnection instruction, and a reconnection instruction.

The preset trigger condition may include but is not limited to expiry of a preset time limit and/or a change of a related service status.

The reconnection instruction may include but is not limited to any one of an instant reconnection instruction, a timed reconnection instruction, and a step-by-step reconnection instruction.

Preferably, the connecting module 404 may be specific to the following two cases.

Case 1: The connecting module 404 includes a first submodule configured to establish, based on the connection request, the connection between the apparatus and the client for the service, and a second submodule configured to: maintain the connection in an on state when the connection mechanism in the policy instruction is an instant connection mechanism, adjust the connection to any one of a persistent connection, a polling connection or a short connection according to the connection instruction in the policy instruction, and disconnect the connection and determine, according to the reconnection instruction in the policy instruction, that a connection reestablishment manner is timed reconnection or step-by-step reconnection when a preset trigger condition of the disconnection instruction in the policy instruction is met.

Case 2: The connecting module 404 includes a first submodule configured to establish, based on the connection request, the connection between the apparatus and the client for the service, and a second submodule configured to disconnect the connection and determine, according to the reconnection instruction in the policy instruction, that a connection reestablishment manner is timed reconnection or step-by-step reconnection when the connection mechanism in the policy instruction is a non-instant connection mechanism.

In an actual application, the second submodule of the connecting module may have functions in both the two cases.

Preferably, the feedback module 403 in the apparatus for connection establishment may be further configured to push, based on the established connection and according to a message transmission request sent by the client for the service, a push message of the service to the client after the connection is established between the apparatus and the client.

Figure 5:
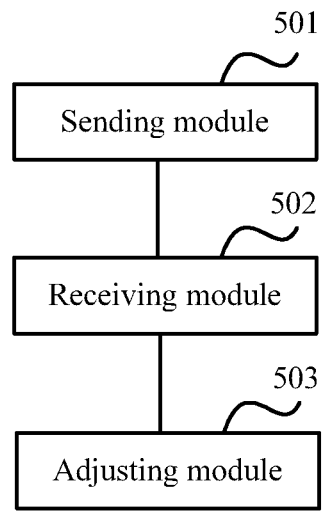
FIG. 5 is a schematic diagram of another apparatus for connection establishment designed according to an embodiment of the present invention.

Based on the same design idea, an embodiment of the present invention further designs an apparatus for connection establishment. As shown in FIG. 5, the apparatus includes a sending module 501 configured to send, based on a service, a registration request and a connection request to a server, a receiving module 502 configured to receive a policy instruction generated and sent, when the service is registered successfully according to the registration request, by the server for the service according to service information carried in the registration request, and an adjusting module 503 configured to adjust an on-off state of the connection according to the policy instruction after the server establishes, based on the connection request, a connection between the server and the apparatus for the service.

Optionally, the policy instruction may include but is not limited to a connection mechanism of the service and a connection instruction that carries a preset trigger condition.

The connection mechanism may include but is not limited to an instant connection mechanism or a non-instant connection mechanism.

The connection instruction may include but is not limited to any one of the following or a combination thereof: a connection maintaining instruction, a disconnection instruction, and a reconnection instruction.

The preset trigger condition may include but is not limited to expiry of a preset time limit and/or a change of a related service status.

The reconnection instruction may include but is not limited to any one of an instant reconnection instruction, a timed reconnection instruction, and a step-by-step reconnection instruction.

Preferably, the adjusting module 503 is configured to maintain the connection in an on state when the connection mechanism in the policy instruction is an instant connection mechanism after the server establishes, based on the connection request, the connection between the server and the apparatus for the service, adjust the connection to any one of a persistent connection, a polling connection, or a short connection according to the connection instruction in the policy instruction, and disconnect the connection and determine, according to the reconnection instruction in the policy instruction, that a connection reestablishment manner is timed reconnection or step-by-step reconnection when a preset trigger condition of the disconnection instruction in the policy instruction is met.

Preferably, the adjusting module 503 is configured to after the server establishes, based on the connection request, the connection between the server and the apparatus for the service, and disconnect the connection and determine, according to the reconnection instruction in the policy instruction, that a connection reestablishment manner is timed reconnection or step-by-step reconnection when the connection mechanism in the policy instruction is a non-instant connection mechanism.

In an actual application, the adjusting module may have both the two specific functions.

The receiving module 502 is further configured to receive a push message of the service and pushed by the server based on the established connection after the server establishes, based on the connection request, the connection between the server and the apparatus for the service, where the push message is pushed by the server according to a message transmission request sent by the apparatus for the service.

The apparatus is corresponding to the method procedures one by one, which is not further described herein.

Figure 6:
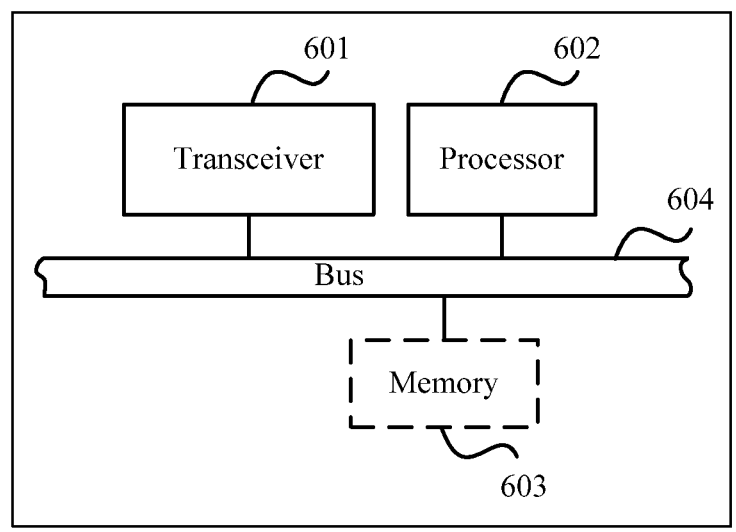
FIG. 6 is a schematic structural diagram of a device for connection establishment designed according to an embodiment of the present invention.

Based on the same design idea, an embodiment of the present invention further designs a device for connection establishment. As shown in FIG. 6, the device for connection establishment includes at least one transceiver 601, at least one processor 602, at least one memory 603, and a bus 604, where the at least one transceiver 601, the at least one processor 602, and the at least one memory 603 are connected through the bus 604 and implement mutual communication, where the transceiver 601 is mainly configured to implement receipt and transmission of communication data between the device for connection establishment and a client in this embodiment.

The transceiver 601 is configured to receive a registration request and a connection request that are sent by a client based on a service.

The processor 602 is configured to invoke program code in the memory 603 to perform the following operations.

Operation 1: When the service is registered successfully according to the registration request, generate a policy instruction for the service according to service information carried in the registration request, where the policy instruction is used to instruct to adjust an on-off state of a connection between the device and the client and established for the service;

Operation 2: Feed back the policy instruction to the client, and instruct the client to adjust, according to the policy instruction, the on-off state of the connection between the device and the client and established for the service.

Operation 3: Establish, based on the connection request, the connection between the device and the client for the service, and adjust, based on the policy instruction, the on-off state of the connection.

Preferably, operation 1 performed by the processor 602 by invoking the program code in the memory 603 includes determining a connection mechanism of the service according to the service information of the service when the service is registered successfully according to the registration request, generating a connection instruction that carries a preset trigger condition, and using the connection mechanism and connection instruction that carries the preset trigger condition as the policy instruction for the service.

Optionally, the connection mechanism may include but is not limited to an instant connection mechanism or a non-instant connection mechanism.

The connection instruction may include but is not limited to any one of the following or a combination thereof: a connection maintaining instruction, a disconnection instruction, and a reconnection instruction.

The preset trigger condition may include but is not limited to expiry of a preset time limit and/or a change of a related service status.

The reconnection instruction may include but is not limited to any one of an instant reconnection instruction, a timed reconnection instruction, and a step-by-step reconnection instruction.

Preferably, the processor may select any one of the following two execution manners or a combination thereof to perform the operation 3.

Execution manner 1: Establishing, based on the connection request, the connection between the device and the client for the service, maintaining the connection in an on state when the connection mechanism in the policy instruction is an instant connection mechanism, adjusting the connection to any one of a persistent connection, a polling connection, or a short connection according to the connection instruction in the policy instruction, and disconnecting the connection and determining, according to the reconnection instruction in the policy instruction, that a connection reestablishment manner is timed reconnection or step-by-step reconnection when a preset trigger condition of the disconnection instruction in the policy instruction is met.

Execution manner 2: Establishing, based on the connection request, the connection between the device and the client for the service, and disconnecting the connection and determining, according to the reconnection instruction in the policy instruction, that a connection reestablishment manner is timed reconnection or step-by-step reconnection when the connection mechanism in the policy instruction is a non-instant connection mechanism.

Preferably, the transceiver 601 may be further configured to push, based on the established connection and according to a message transmission request sent by the client for the service, a push message of the service to the client after the connection is established between the device and the client.

The device for connection establishment may be a server.

Figure 7:
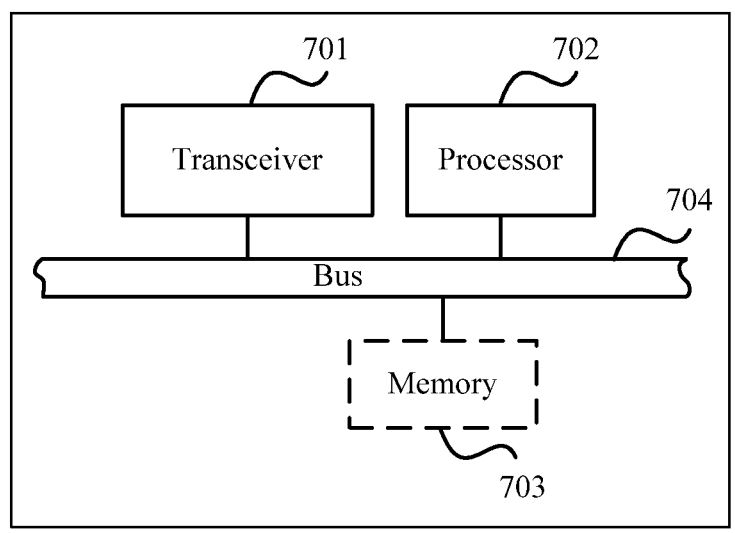
FIG. 7 is a schematic structural diagram of another device for connection establishment designed according to an embodiment of the present invention.

Based on the same design idea, an embodiment of the present invention further designs a device for connection establishment. As shown in FIG. 7, the device for connection establishment includes at least one transceiver 701, at least one processor 702, at least one memory 703, and a bus 704, where the at least one transceiver 701, the at least one processor 702, and the at least one memory 703 are connected through the bus 704 and implement mutual communication, where the transceiver 701 is mainly configured to implement receipt and transmission of communication data between the device for connection establishment and a server in this embodiment.

The transceiver 701 is configured to send, based on a service, a registration request and a connection request to the server, and receive a policy instruction generated and sent, when the service is registered successfully according to the registration request, by the server according to service information carried in the registration request.

The processor 702 is configured to invoke program code in the memory 703 to perform the following operation: after the server establishes, based on the connection request, a connection between the server and the apparatus for the service, adjust an on-off state of the connection according to the policy instruction.

Optionally, the policy instruction may include but is not limited to a connection mechanism of the service and a connection instruction that carries a preset trigger condition.

The connection mechanism may include but is not limited to an instant connection mechanism or a non-instant connection mechanism.

The connection instruction may include but is not limited to any one of the following or a combination thereof: a connection maintaining instruction, a disconnection instruction, and a reconnection instruction.

The preset trigger condition may include but is not limited to expiry of a preset time limit and/or a change of a related service status.

The reconnection instruction may include but is not limited to any one of an instant reconnection instruction, a timed reconnection instruction, and a step-by-step reconnection instruction.

Preferably, the operation performed by the processor 702 by invoking the program code in the memory 703 includes but is not limited to any one of the following two operations or a combination thereof.

Operation 1: After the server establishes, based on the connection request, the connection between the server and the apparatus for the service, maintain the connection in an on state when the connection mechanism in the policy instruction is an instant connection mechanism, adjust the connection to any one of a persistent connection, a polling connection or a short connection according to the connection instruction in the policy instruction, and disconnect the connection and determine, according to the reconnection instruction in the policy instruction, that a connection reestablishment manner is timed reconnection or step-by-step reconnection when a preset trigger condition of the disconnection instruction in the policy instruction is met.

Operation 2: After the server establishes, based on the connection request, the connection between the server and the apparatus for the service, and when the connection mechanism in the policy instruction is a non-instant connection mechanism, disconnect the connection and determine, according to the reconnection instruction in the policy instruction, that a connection reestablishment manner is timed reconnection or step-by-step reconnection.

The transceiver 701 is further configured to receive a push message of the service and pushed by the server based on the established connection after the server establishes, based on the connection request, the connection between the server and the apparatus for the service, where the push message is pushed by the server according to a message transmission request sent by the apparatus for the service.

The device for connection establishment may be a client, and may also be a mobile terminal that communicates with one or more core networks through a radio access network (RAN). The mobile terminal may be a mobile phone (or called "cellular" phone) or a computer with a mobile terminal, for example, the mobile terminal may be a portable, pocket-sized, handheld, computer built-in or vehicle-mounted mobile apparatus, which exchanges language and/or data with the radio access network. For another example, the mobile terminal may be a personal communication service (PCS) phone, a cordless phone set, a session initiation protocol (SIP) phone, a wireless local loop (WLL) station, a personal digital assistant (PDA) or the like, a subscriber unit, a subscriber station, a mobile station, a mobile, a remote station, an access point, a remote terminal, an access terminal, a user terminal, a user agent, or a user device.

In the two embodiments, the bus 604 and/or the bus 704 may be an industry standard architecture (ISA) bus, a peripheral component interconnect (PCI) bus, an extended industry standard architecture (EISA) bus, or the like. The bus 604 and/or the bus 704 may be divided into an address bus, a data bus, a control bus, or the like. For the convenience of representation, the bus in FIG. 6 and FIG. 7 is represented by using one solid line only, but it does not mean that there is only one bus or one type of bus.

The memory 603 and/or the memory 703 are/is configured to store program code, where the program code includes an operation instruction. The memory 603 and/or the memory 703 may include a high-speed random access memory (RAM), and may also include a non-volatile memory, for example, a magnetic disk memory or a micro secure digital (SD) card.

The processor 602 and/or the processor 702 may be a central processing unit (CPU), or an Application Specific Integrated Circuit (ASIC), or configured as one or multiple integrated circuits that implement this embodiment of the present invention.

In this embodiment of the present invention, when a server determines that a client has registered successfully for a service, the server feeds back a corresponding registration response and a policy instruction according to service information of the service, adjusts an on-off state of a connection between the server and the client according to the policy instruction, determines maintaining time of the connection according to an actual requirement, and disconnects the connection in time when there is no service requirement, which avoids that the connection between the server and the client is maintained for a long period of time and eliminates the need of frequent initiation of data calls, thereby avoiding a problem of over consumption of electricity.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an built-in processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, so as to generate computer-implemented processing. Thereby, the instructions executed on the computer or the another programmable device provide steps for implementing a specific function in one or more processes in the flowcharts and/or in one or more blocks in the block diagrams.

Although some exemplary embodiments of the present invention have been described, persons skilled in the art can make changes and modifications to these embodiments once they learn the basic inventive concept. Therefore, the following claims are intended to be construed as to cover the exemplary embodiments and all changes and modifications falling within the scope of the present invention.

Persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalents.

What is claimed is:

1. A method for connection establishment, comprising:
   receiving a registration request and a connection request that are sent by a client based on a service;
   generating a policy instruction for the service according to service information carried in the registration request when the service is registered successfully according to the registration request, wherein the policy instruction is used to instruct to adjust an on-off state of a connection between a server and the client and established for the service;
   feeding back the policy instruction to the client;
   instructing the client to adjust, according to the policy instruction, the on-off state of the connection between the server and the client and established for the service;
   establishing, based on the connection request, the connection between the server and the client for the service; and
   adjusting, based on the policy instruction, the on-off state of the connection.

2. The method according to claim 1, wherein the generating the policy instruction for the service comprises:
   determining a connection mechanism of the service according to the service information of the service;
   generating a connection instruction that carries a preset trigger condition; and
   using the connection mechanism and the connection instruction that carries the preset trigger condition as the policy instruction for the service.

3. The method according to claim 2, wherein the connection mechanism comprises an instant connection mechanism or a non-instant connection mechanism, wherein the connection instruction comprises one of a connection maintaining instruction, a disconnection instruction, a reconnection instruction, and a combination thereof, and wherein the preset trigger condition comprises expiry of a preset time limit or a change of a related service status.

4. The method according to claim 3, wherein the reconnection instruction comprises one of an instant reconnection instruction, a timed reconnection instruction, and a step-by-step reconnection instruction.

5. The method according to claim 4, wherein the adjusting the on-off state of the connection comprises:
   maintaining the connection in an on state when the connection mechanism in the policy instruction is an instant connection mechanism;
   adjusting the connection to one of a persistent connection, a polling connection, and a short connection according to the connection instruction in the policy instruction; and
   disconnecting the connection and determining, according to the reconnection instruction in the policy instruction, that a connection reestablishment manner is timed reconnection or step-by-step reconnection when a preset trigger condition of the disconnection instruction in the policy instruction is met.

6. The method according to claim 4, wherein the adjusting the on-off state of the connection comprises disconnecting the connection and determining, according to the reconnection instruction in the policy instruction, that a connection reestablishment manner is timed reconnection or step-by-step reconnection when the connection mechanism in the policy instruction is a non-instant connection mechanism.

7. The method according to claim 1, wherein after the connection is established between the server and the client, further comprising pushing, based on the established connection and according to a message transmission request sent by the client for the service, a push message of the service to the client.

8. A method for connection establishment, comprising:
   sending, based on a service, a registration request and a connection request to a server;
   receiving a policy instruction generated and sent by the server for the service according to service information carried in the registration request when the service is registered successfully according to the registration request; and
   adjusting an on-off state of the connection according to the policy instruction after the server establishes, based on the connection request, a connection between the server and a client for the service.

9. The method according to claim 8, wherein the policy instruction comprises a connection mechanism of the service and a connection instruction that carries a preset trigger condition.

10. The method according to claim 9, wherein the connection mechanism comprises an instant connection mechanism or a non-instant connection mechanism, wherein the connection instruction comprises one of a connection maintaining instruction, a disconnection instruction, a reconnection instruction, and a combination thereof, and the preset trigger condition comprises expiry of a preset time limit or a change of a related service status.

11. The method according to claim 10, wherein the reconnection instruction comprises one of an instant reconnection instruction, a timed reconnection instruction, and a step-by-step reconnection instruction.

12. The method according to claim 11, wherein the adjusting an on-off state of the connection according to the policy instruction specifically comprises:
maintaining the connection in an on state when the connection mechanism in the policy instruction is an instant connection mechanism;
adjusting the connection to one of a persistent connection, a polling connection, or a short connection according to the connection instruction in the policy instruction; and
disconnecting the connection and determining, according to the reconnection instruction in the policy instruction, that a connection reestablishment manner is timed reconnection or step-by-step reconnection when a preset trigger condition of the disconnection instruction in the policy instruction is met.

13. The method according to claim 11, wherein the adjusting an on-off state of the connection according to the policy instruction comprises:
disconnecting the connection when the connection mechanism in the policy instruction is a non-instant connection mechanism; and
determining, according to the reconnection instruction in the policy instruction, that a connection reestablishment manner is timed reconnection or step-by-step reconnection.

14. The method according to claim 9, wherein after the server establishes, based on the connection request, the connection between the server and the client for the service, further comprising receiving a push message of the service and pushed by the server based on the established connection, wherein the push message of the service is pushed by the server according to a message transmission request sent by the client for the service.

15. An apparatus for connection establishment, comprising:
a receiving module configured to receive a registration request and a connection request sent by a client based on a service;
a generating module configured to generate a policy instruction for the service according to service information carried in the registration request when the service is registered successfully according to the registration request, wherein the policy instruction is used to instruct to adjust an on-off state of a connection between the apparatus and the client and established for the service;
a feedback module configured to feed back the policy instruction to the client and instruct the client to adjust, according to the policy instruction, the on-off state of the connection between the apparatus and the client and established for the service; and
a connecting module configured to establish, based on the connection request, the connection between the apparatus and the client for the service, and adjust, based on the policy instruction, the on-off state of the connection.

16. The apparatus according to claim 15, wherein the generating module is configured to:
determine a connection mechanism of the service according to the service information of the service when the service is registered successfully according to the registration request;
generate a connection instruction that carries a preset trigger condition; and
use the connection mechanism and the connection instruction that carries the preset trigger condition as the policy instruction for the service.

17. The apparatus according to claim 15, wherein the connecting module comprises:
a first submodule configured to establish, based on the connection request, the connection between the apparatus and the client for the service; and
a second submodule configured to maintain the connection in an on state when the connection mechanism in the policy instruction is an instant connection mechanism, adjust the connection to one of a persistent connection, a polling connection, or a short connection according to the connection instruction in the policy instruction, and disconnect the connection and determine, according to the reconnection instruction in the policy instruction, that a connection reestablishment manner is timed reconnection or step-by-step reconnection when a preset trigger condition of the disconnection instruction in the policy instruction is met.

18. The apparatus according to claim 15, wherein the connecting module comprises:
a first submodule configured to establish, based on the connection request, the connection between the apparatus and the client for the service; and
a second submodule configured to disconnect the connection and determine, according to the reconnection instruction in the policy instruction, that a connection reestablishment manner is timed reconnection or step-by-step reconnection when the connection mechanism in the policy instruction is a non-instant connection mechanism.

19. An apparatus for connection establishment, comprising:
a sending module configured to send, based on a service, a registration request and a connection request to a server;
a receiving module configured to receive a policy instruction generated and sent, when the service is registered successfully according to the registration request, by the server for the service according to service information that is of the service and carried in the registration request; and
an adjusting module configured to adjust an on-off state of the connection according to the policy instruction after the server establishes, based on the connection request, a connection between the server and the apparatus for the service.

20. The apparatus according to claim 19, wherein the adjusting module is configured to maintain the connection in an on state when the connection mechanism in the policy instruction is an instant connection mechanism after the server establishes, based on the connection request, the connection between the server and the apparatus for the service, adjust the connection to any one of a persistent connection, a polling connection or a short connection according to the connection instruction in the policy instruction, and disconnect the connection and determine, according to the reconnection instruction in the policy instruction, that a connection reestablishment manner is timed reconnection or step-by-step reconnection when a preset trigger condition of the disconnection instruction in the policy instruction is met.

* * * * *